Oct. 13, 1970            B. L. LEWIS            3,533,577
SPACECRAFT STABILIZATION AND ROTATION SYSTEM
Filed May 16, 1967
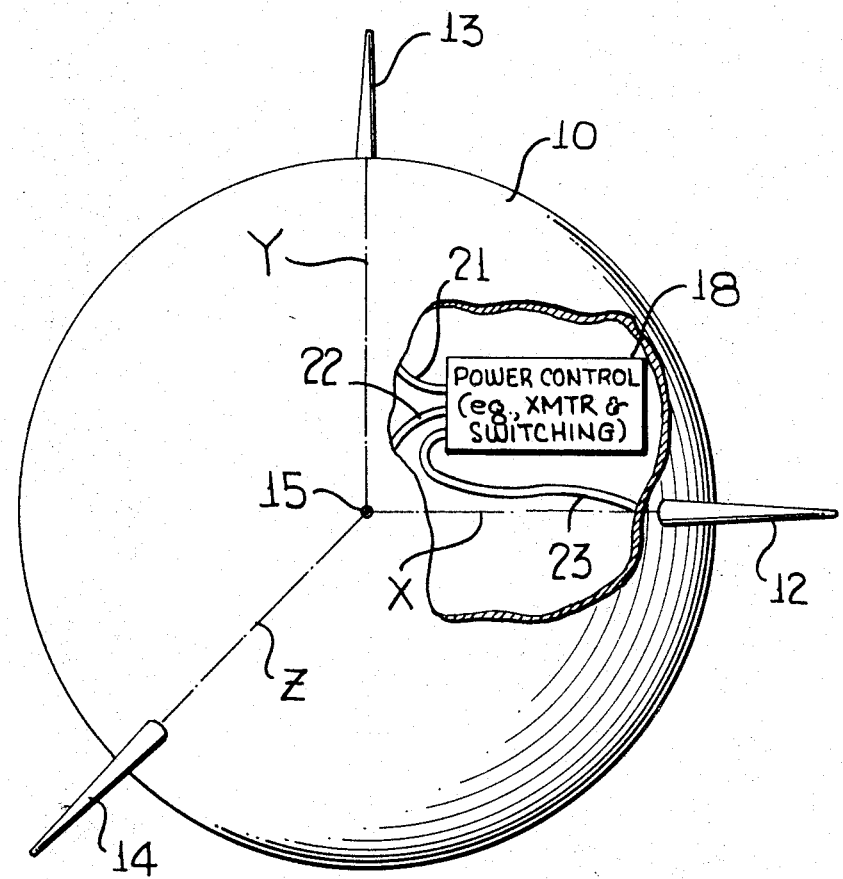
INVENTOR
BERNARD L. LEWIS
ATTORNEYS United States Patent Office 3,533,577
Patented Oct. 13, 1970

3,533,577
**SPACECRAFT STABILIZATION AND
ROTATION SYSTEM**
Bernard L. Lewis, Indian Harbour Beach, Fla., assignor
to Radiation Incorporated, Melbourne, Fla., a corporation of Florida
Filed May 16, 1967, Ser. No. 638,776
Int. Cl. B64g 1/00
U.S. Cl. 244—1                                                   3 Claims

ABSTRACT OF THE DISCLOSURE

A spacecraft is oriented in free space by selectively emitting circularly polarized electromagnetic waves from one or more antennas positioned generally symmetrically about the center of mass of the spacecraft. The waves are emitted in a direction generally normal to that in which the spacecraft is desired to move, to produce a torque on the respective antennas in a direction opposite that of the angular momentum of the photons of the waves and hence to produce a torque on the spacecraft itself for rotation in the desired direction.

BACKGROUND OF THE INVENTION

Burgeoning interest and activity in space exploration and manned and unmanned probes and vehicles, both remote and manually controlled, over the past several years has led to a series of proposals on propulsion, stabilization, and steering systems for spacecraft, beyond the conventional chemical propulsion systems in which solid and liquid fuels are utilized in a thermochemical reaction. For example, propulsion systems have been deviced in which the reaction engines eject charged particles or electrically neutral beams. In the former case ions are produced and accelerated by suitable electric fields, while the latter type of engine requires a plasma discharge and subsequent acceleration of the plasma by varying high strength magnetic fields. Still other suggestions include the use of solar radiation pressure to produce the desired thrust on the space vehicle. Since the magnitude of the thrust produced by such systems is rather small (usually less than $10^{-3}$ g's), they are not ordinarily useful for large craft within the influence of a planet's gravitational field. Accordingly, chemical propulsion is utilized to provide the escape velocity, and such systems as electric and solar propulsion employed to provide space drive.

Similar systems have been suggested for use in stabilization, orientation and steering of space vehicles. For example, in U.S. Pat. No. 3,219,292, Chubb discloses an orientation system for spacecraft, in which ion collector plates are disposed on the vehicle to provide currents which are unbalanced except when the space vehicle is headed in a direction along its predetermined velocity vector. Schalkowsky, in U.S. Pat. 3,258,598 describes a stable self-orienting system for spacecraft in which absorption and reflection of solar radiation produce the desired torque on the vehicle. A magnetic control system for steering spacecraft, in which alignment of a magnet mounted in the vehicle along the existing magnetic field lines orients the craft itself, is disclosed by Wilson in U.S. Pat. 3,190,581.

SUMMARY OF THE INVENTION

It is a principal object of the present invention to provide a stabilization and rotation system for spacecraft through which torque of desired magnitude and direction may be exerted on the craft by selective radiation from electromagnetic wave radiators positioned on the craft.

Briefly, according to a preferred embodiment of the invention a purality of electromagnetic wave launchers, such as dipole antennas, are selected and are arranged on board the spacecraft for capability of providing circuitry polarized radiation in three mutually orthogonal directions. By selectively controlling the power radiated by each launcher, the spacecraft may be stabilized or rotated about any desired axis in space as a result of recoil to angular momentum of launched photons. To this end, the dipoles are initially mounted or are subsequently erected (using known methods of in-flight remote or proximate extension of antennas) along mutually orthogonal axes preferably having an intersection point or origin at the center of mass of the spacecraft. The antennas are so fed as to emit circularly polarized radiation in a direction to produce the desired moment of torque. In essence, reaction to the launching of photons by the antennas is manifested as a torque on the respective antennas in a direction opposite that of the angular momentum of the photons, and hence as a resultant torque on the spacecraft itself.

Therefore, it is another object of the invention to provide a reaction system for stabilization and rotation of a space vehicle in response to emission of radiation from circularly polarized antennas mounted on the space vehicle.

BRIEF DESCRIPTION OF THE DRAWINGS

The above and still further objects, features and attendant advantages of the present invention will become apparent from a consideration of the following detailed description of a preferred embodiment thereof, especially when taken in conjunction with the accompanying drawings, in which:

The sole figure is a simplified diagrammatic view of a spacecraft provided with a torque producing system which may be employed to stabilize, and/or rotate, the spacecraft.

DESCRIPTION OF THE PREFERRED EMBODIMENT

Before entering into a description of a specific embodiment, it will be helpful to consider some of the theoretical aspects of the invention. Photon angular momentum provides a very efficient reaction engine for stabilization and rotation of a spacecraft in terms of the ratio of kinetic energy delivered to the spacecraft to the total energy expended. The high efficiency stems from the fact that the angular momentum of a photon in independent of its energy, as will be demonstrated presently. Moreover, as is well known, the angular momentum of a photon is independent of its frequency. Accordingly, the angular momentum recoil or reaction available from a constant power transmitter increases directly with a decrease in frequency. The efficiency of any spacecraft engine employing this type of reaction therefore increases with reduction in the frequency radiated.

In essence, this results from the fact that the effective areas of small photon launchers increase with a decrease in frequency. An effect is an increase in the radius of gyration of the photon about its line of flight as the frequency is decreased, and maintenance of constant angular momentum of the photon.

Returning now to a demonstration of the fact that the angular momentum of a photon is independent of its energy, the angular momentum carried away per unit time by the photons in a beam from a transmitter radiating a power P is $$\Omega = \frac{P}{2\pi v}$$

where $v$ is the frequency radiated. Since momentum must be conserved, the launcher must recoil with equal and opposite momentum. In so doing, it gains energy $$E = \frac{P\omega_o}{2\pi v} + \frac{P^2}{2(2\pi v)^2 I} \qquad (2)$$

each second whereby $\omega_o$ is the angular velocity and I is the moment of inertia of the recoiling mass. In this expression E is taken to be $$E = \frac{1}{2}(I\omega_o + \Omega)(\omega_o + \dot{\omega}\,\text{sec}) - \frac{1}{2}I\omega_o^2 \qquad (3)$$

where $\dot{\omega}$ sec is the velocity added to the mass per unit time by $\Omega$. Assuming that $\omega_o$ is much greater than $\dot{\omega}$ sec, the efficiency may readily be shown to be $$\eta = \frac{E}{P} \approx \frac{\omega_o}{2\pi v} \qquad (4)$$

If the launcher is used as a gyroscope wheel, $\omega_o$ can be high and $\eta$ can be made large by making $v$ small. Spacecraft orientation is then achieved by torquing against the gyro provided the launcher with a conventional motor. The radiation reaction in that case is only used to make up frictional losses.

Inductively loaded, cross polarized dipoles suffice for the photon launcher; the radiation should be circularly polarized to contain the maximum obtainable angular momentum.

The effective area of an incrementally short antenna is inversely proportional to the square of the frequency radiated. This explains the constancy of the photon angular momentum. The effective mass $m$ of the photon is distributed over an area normal to the direction of propagation that is inversely proportional to the square of the frequency. Thus, its radius of gyration R increases as its effective mass and angular velocity $2\pi v$ decreases. Since angular momentum is $2\pi vmR^2$, the angular momentum remains constant.

The efficiency of this type of motor as compared to gas jets is computed in terms of the total energy lost to the spacecraft and found to be $$\eta^1 = \frac{C^2}{2\pi v v L} \qquad (5)$$

where C is the velocity of light, $v$ is the velocity of the velocity of the gas jet and L is the moment arm through which the jet works. In this computation, the efficiency of the gas jet is taken to be $$\eta_\text{g} = \frac{mvL\omega_o}{mC^2} \qquad (6)$$

where $m$ is the mass of gas expelled per second, $mv$ is the time rate of change of linear momentum or force acting on the jet source, $L\omega_o$ is the distance through which this force acts and $mC^2$ is the total energy lost to the spacecraft each second. It is obvious that $\eta^1$ is much greater than unity for any conceivable values of $v$ and L and reasonable values of $v$.

The ratio of efficiencies of a photon angular momentum motor is that of a gas jet motor in terms of kinetic rather than total energy expended is found as follows:

The power $P_p$ that would have to be radiated by the photon launcher to obtain the same torque as produced by a gas jet with an exhaust velocity $v$ and mass flow mate $m$ acting through a lever arm of length L is given by $$P_p = 2\pi vmvL \qquad (7)$$

Under these conditions the power supplied by the jet would be $$P_j = \frac{mv^2}{2} \qquad (8)$$

Thus, the ratio of kinetic energy efficiencies is $$\eta_k = \frac{P_p}{P_j} = \frac{4\pi vL}{v} \qquad (9)$$

Referring now to the drawing, an embodiment of the invention shown in simplified, partially fragmented diagrammatic form and perspective view, comprises three dipole antennas 12, 13, 14 disposed along mutually orthogonal axes X, Y, Z on a spacecraft 10. The origin of the axes, or point of intersection, is at least approximately at the center of mass 15 of craft 10. Each antenna may, for example, comprise two inductively loaded cross polarized dipoles for providing the circularly polarized radiation, and in that instance each antenna is effectively a launcher of photons of maximum angular momentum.

Each of the antennas is fed in any convenient and conventional manner, such as by a remotely controlled transmitter 18 which may include means for controlling the amount of power applied to each feed line 20, 21, 22. A suitable power control, for example, would include remotely operable (for unmanned craft) switches for selectively coupling the transmitter output or a portion thereof to an appropriate feed line or lines.

As the antennas emit the circularly polarized waves, either separately or in selected combination, reaction (recoil) to the launched photons is manifested by an equal and opposite torque on the launching antenna or antennas, producing a consequent rotation of the spacecraft about its center of mass (in a preferred direction or about a preferred axis).

The energy supplied to the feed lines may be switched on and off in any desired sequence or combination by selectively coupling each antenna to its respective feed line, and as rapidly as desired within the switching capabilities of the system, the establish a preferred orientation of the craft, to stabilize the craft, or to rotate the craft about a preferred axis in space.

The lower the frequency radiated, the higher the efficiency of the system, since as previously demonstrated, the angular momentum of a photon is independent of its energy and the lower the frequency the more photons emitted for a given radiated power.

While I have disclosed a preferred embodiment of my invention, it will be apparent that variations in the specific details of construction which have been illustrated and described may be resorted to without departing from the spirit and scope of the invention.

I claim:

1. The method of controlling the orientation of a spacecraft in free space, comprising the steps of providing said spacecraft with electromagnetic wave launchers for radiating circularly polarized waves, and selectively radiating circularly polarized electromagnetic waves from said launchers, when said spacecraft is in space, in a direction generally perpendicular to the direction in which the spacecraft is desired to move, to produce a resultant torque on the electromagnetic wave launchers of the spacecraft from which said waves are selectively radiated for rotation of the spacecraft in said desired direction.

2. The method according to claim 1 wherein said electromagnetic wave launchers are provided for radiating circularly polarized waves in any of three mutually orthogonal directions.

3. The method according to claim 2 wherein said step of selectively radiating includes selectively feeding power to at least one of said launchers to radiate the circularly polarized waves in one of said directions.

References Cited

UNITED STATES PATENTS

| | | | |
|---|---|---|---|
| 2,823,381 | 2/1958 | Martin et al. | 343—797 |
| 3,114,517 | 12/1963 | Brown | 343—708 X |
| 3,128,467 | 4/1964 | Lanctot | 343—785 X |
| 3,188,640 | 6/1965 | Simon et al. | 343—100 |
| 3,262,120 | 7/1966 | Ikrath et al. | 343—785 |

MILTON BUCHLER, Primary Examiner

R. A. DORNON, Assistant Examiner

U.S. Cl. X.R.

307—308; 310—2; 343—708